United States Patent
Baggs (10) Patent No.: US 6,983,078 B2
(45) Date of Patent: Jan. 3, 2006

(54) SYSTEM AND METHOD FOR IMPROVING IMAGE QUALITY IN PROCESSED IMAGES

(75) Inventor: Scott Baggs, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 663 days.

(21) Appl. No.: 09/846,408

(22) Filed: May 1, 2001

(65) Prior Publication Data

US 2002/0164084 A1 Nov. 7, 2002

(51) Int. Cl.
G06K 9/40 (2006.01)

(52) U.S. Cl. ............... 382/275; 382/254; 358/3.26
(58) Field of Classification Search .............. 382/275, 382/272, 273, 268, 261, 264, 252, 248, 250, 382/254; 358/448, 447, 463, 3.26
See application file for complete search history.

(56) References Cited

U.S. PATENT DOCUMENTS

| | | | | |
|---|---|---|---|---|
| 5,675,666 A | * | 10/1997 | Komuro et al. | 382/232 |
| 5,796,875 A | | 8/1998 | Read | |
| 5,799,111 A | | 8/1998 | Guissin | |
| 5,933,540 A | * | 8/1999 | Lakshminarayanan et al. | 382/260 |
| 6,285,801 B1 | * | 9/2001 | Mancuso et al. | 382/268 |
| 6,529,622 B1 | * | 3/2003 | Pourjavid | 382/149 |
| 6,529,638 B1 | * | 3/2003 | Westerman | 382/275 |

FOREIGN PATENT DOCUMENTS

| | | |
|---|---|---|
| EP | 0794671 A2 | 12/1996 |
| EP | 0999709 A2 | 10/2000 |
| JP | 10276433 A | 3/1997 |

OTHER PUBLICATIONS

Web Page, [75] Introduction to JPEG, http://www.faqs.org/ffaqs/compression-faq/part2/sectionn-6.html, Feb. 12, 2001, pp. 1-5.

* cited by examiner

Primary Examiner—Yon J. Couso (57) ABSTRACT

A system and method for reducing image artifacts from a processed image are disclosed. An image enhancing system can be implemented with a memory device, an image region segmenter, an artifact detector, and a filter. The region segmenter may be configured to sub-divide an image frame. Each region may be processed by the artifact detector to identify when an image artifact is present in the region. The identified regions may be forwarded to the filter to smooth the harshness of the picture element discontinuities. The method for reducing image artifacts in a compressed and decompressed image can be broadly summarized by the following steps: receiving picture element data associated with at least one image frame; segmenting the at least one image frame into a plurality of regions in accordance with a first viewer selected imaging parameter; analyzing the plurality of segmented regions to identify regions that contain an image artifact in response to a second viewer selected imaging parameter; processing the identified regions with a filter such that at least one picture element data parameter is adjusted in response to both a third and a fourth viewer selected imaging parameters; and inserting adjusted picture element data values into the at least one image frame.

34 Claims, 9 Drawing Sheets

SYSTEM AND METHOD FOR IMPROVING IMAGE QUALITY IN PROCESSED IMAGES

BACKGROUND OF THE INVENTION

1. Field of the Invention

The present disclosure relates to systems and methods for processing digital image signals. More particularly, the invention relates to a system and method that improves image quality by reducing the harshness of distortions in compressed digital image signals.

2. Discussion of the Related Art

A digital image signal generally contains information associated with a plurality of picture elements, e.g., pixels, Digital images typically contain large amounts of information (e.g., color and brightness information related to each of the plurality of pixels) needed to reproduce the image. As a result, data compression is often implemented to reduce the amount of memory that images require for processing and storage. Data compression is important not just for long term digital storage of an image but for permitting reasonable data transfer rates over network connected devices.

JPEG is a standardized image compression mechanism. JPEG stands for Joint Photographic Experts Group, the original name of the committee that wrote the standard. JPEG is designed for compressing either full-color or gray-scale digital images of "natural," real-world scenes. JPEG compression does not work very well on non-realistic images, such as cartoons or line drawings. JPEG compression does not handle black-and-white (1-bit-per-pixel) images, nor does it handle motion picture compression. Related standards for compressing those types of images exist, and are called JBIG and MPEG respectively. Regular JPEG is "lossy," meaning that the image you get out of decompression is not identical to what you originally put in. The algorithm achieves much of its compression by exploiting known limitations of the human eye, notably the fact that small color variations are not perceived as well as small variations in brightness.

The JPEG compression process is a multi-parameter compression process. By adjusting the parameters, you can trade off compressed image size against reconstructed image quality over a very wide range. In general, the baseline JPEG compression process performs the following steps:

1. Transform the image into a suitable color space. This is a no-op for grayscale images. For color images, RGB information is transformed into a luminance/chrominance color space (e.g., YCbCr, YUV, etc). The luminance component is grayscale and the other two axes are color information.
2. (Optional) Down sample each component by averaging together groups of pixels. The luminance component is left at full resolution, while the chroma components are often reduced 2:1 horizontally and either 2:1 or 1:1 (no change) vertically. In JPEG, these alternatives are usually called 2h2v and 2h1v sampling, but you may also see the terms "411" and "422" sampling. This step immediately reduces the data volume by one-half or one-third. In numerical terms it is highly lossy, but for most images it has almost no impact on perceived quality, because of the eye's poorer resolution for chroma info. Note that down sampling is not applicable to grayscale data; this is one reason color images are more compressible than grayscale.
3. Group the pixel values for each component into 8×8 blocks. Transform each 8×8 block through a discrete cosine transform (DCT). The DCT is a relative of the Fourier transform and likewise gives a frequency map, with 8×8 components. Thus you now have numbers representing the average value in each block and successively higher-frequency changes within the block. The motivation for doing this is that you can now throw away high-frequency information without affecting low-frequency information. (The DCT transform itself is reversible except for round off error.)
4. In each block, divide each of the 64 frequency components by a separate "quantization coefficient" and round the results to integers. This is the fundamental information-losing step. The larger the quantization coefficients, the more data is discarded. Note that even the minimum possible quantization coefficient, 1, loses some info, because the exact DCT outputs are typically not integers. Higher frequencies are always quantized less accurately (given larger coefficients) than lower, since they are less visible to the eye. Also, the luminance data is typically quantized more accurately than the chroma data, by using separate 64-element quantization tables.
5. Encode the reduced coefficients using either Huffman or arithmetic coding.
6. Tack on appropriate headers, etc., and output the result. In normal "interchange" JPEG file, all of the compression parameters are included in the headers so that the decompressor can reverse the process. These parameters include the quantization tables and the Huffman coding tables.

(See generally pages 1–2 "Introduction to JPEG" http://www.faq.org/faqs/compression-faq/part2/section-6.html)

A series of digital image signals may be concatenated (i.e., strung together in series) to form a video or video sequence. Consider the case of a video sequence where nothing is moving in the scene. Each frame of the video should be exactly the same as the previous frame. In a digital system, it should be clear that a single frame and a repetition count could represent this video sequence.

Consider now, a man walking across the same scene. If information regarding the motion of the man can be extracted from the static background a great deal of storage space can be saved. This oversimplified case reveals two of the most difficult problems in motion compensation: 1) determining if an image is stationary; and 2) determining how and what portion of an image to extract for the portion of the image that moves.

These problems are addressed in the Moving Pictures Experts Group (MPEG) digital video and audio compression standard. In particular, the standard defines a compressed bit stream, which implicitly defines a decompressor. The most fundamental difference between MPEG and JPEG is MPEG's use of block-based motion compensated prediction (MCP), a general method which uses a temporal differential pulse code modulation (DPCM) scheme.

Usually, MCP and related block-based error coding techniques perform well when the image can be modeled locally as translational motion. However, when there is complex motion or new imagery, these error coding schemes may perform poorly, and the error signal may be harder to encode than the original signal. In such cases, it is sometimes better to suppress the error-coding scheme and code the original signal itself. It may be determined on a block-by-block basis whether to use an error-coding scheme and code the error signal, or to simply code the original signal. This type of coding is often referred to as inter/intra processing, because the encoder switches between inter-frame and intra-frame processing.

Block-based MCP and inter/intra decision-making are the basic temporal processing elements for many conventional video compression standards. Generally, these block-based temporal processing schemes perform well over a wide range of image scenes, enable simpler implementation than other approaches, and interface reasonably well with any block DCT processing of the error signal.

For complex scenes and/or low bit rates, a number of visual artifacts may appear as a result of signal distortion from a compression system. The primary visual artifacts affecting current image compression systems are blocking effects and intermittent distortions, often near object boundaries, often called mosquito noise. Other artifacts include ripple, contouring, and loss of resolution.

Blocking effects generally result from discontinuities in the reconstructed signal's characteristics across block boundaries for a block-based coding system, e.g., block DCT. Blocking effects are produced because adjacent blocks in an image are processed independently and the resulting independent distortion from block to block causes a lack of continuity between neighboring blocks. The lack of continuity may be in the form of abrupt changes in the signal intensity or signal gradient. In addition, block-type contouring, which is a special case of blocking effect, often results in instances when the intensity of an image is slowly changing.

Mosquito noise is typically seen when there is a sharp edge, e.g. an edge within a block separating two uniform but distinct regions. Block DCT applications are not effective at representing sharp edges. Accordingly, there is considerable distortion at sharp edges: the reconstructed edges are not as sharp as normal and the adjacent regions are not as uniform as they should be. Mosquito noise is especially evident in images containing text or computer graphics.

Many of the image compression standards available today, e.g. H261, JPEG, MPEG-1, MPEG-2, and High Definition Television (HDTV), are based on block DCT coding. Thus, most reproduced images may be adversely affected by blocking effects and edge distortion.

In addition to the image artifacts introduced by video signal compression and decompression, today's community antenna television (CATV), digital broadcast satellite (DBS), and digital television (DTV) broadcasters, as well as, other deliverers of compressed digital images, are faced with a plethora of end user consumer electronics solutions for displaying the images. For example, consumer electronics manufacturers are presently offering HDTV, DTV, and analog TV units. Also on the market are a wide range of personal computer (PC) based TV tuner cards that are capable of displaying full HDTV resolutions on appropriate multi-scan monitors. Indeed, multi-scan monitors with TV tuners are being made even larger to accommodate progressive scan signals on monitors that look like traditional TVs.

Digital TVs generally fall into three main categories: integrated high definition sets that include a digital receiver and display; digital set-top boxes designed to work with HD and standard definition (SD) digital displays (and, in some cases, with current analog sets); and DTV-capable displays that, with the addition of a digital set-top box, offer a complete DTV system.

Heretofore, DTV receivers designated for the home theater market generally include a large-screen "digital ready" display and—at extra cost—a separate set-top box that encodes analog TV signals and provides the signals to the DTV receiver. As a result, consumers can watch big, beautiful, analog generated pictures now, and later, when more digital programming becomes available, they can purchase a decoder box to view digitally generated programming at HDTV resolutions.

These decoder boxes will also prolong the life of current analog TVs, as consumers will be able to view digitally generated programming on their old TV set (i.e., an analog black and white and/or color TV). Whether the set-top box is functioning as a encoder or a decoder both analog TVs and DTVs are adversely affected by the block DCT coding introduced image artifacts.

SUMMARY OF THE INVENTION

In response to these and other shortcomings of the prior art, the present invention relates to a system and method for post-processing a bit stream comprising a decompressed representation of a compressed image or video. Briefly described, in architecture, the system can be implemented with a memory device, an image region segmenter, an artifact detector, and a filter. The region segmenter may be configured to sub-divide an image frame into a plurality of regions comprising a plurality of picture elements. Each region may be processed by the artifact detector to identify if a discontinuity between adjacent picture element data values is present in the region. Those regions identified as having a picture element data discontinuity may be forwarded to the filter to smooth the harshness of the picture element discontinuity.

The present invention can also be viewed as providing a method for reducing image artifacts in a compressed and decompressed image. In this regard, the method can be broadly summarized by the following steps: receiving picture element data associated with an image frame; segmenting the image frame into a plurality of regions; identifying regions within the image frame that include a possible image artifact; processing the identified regions with a filter such that at least one picture element data parameter is adjusted; and inserting the updated picture elements into the image frame.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF A PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1:
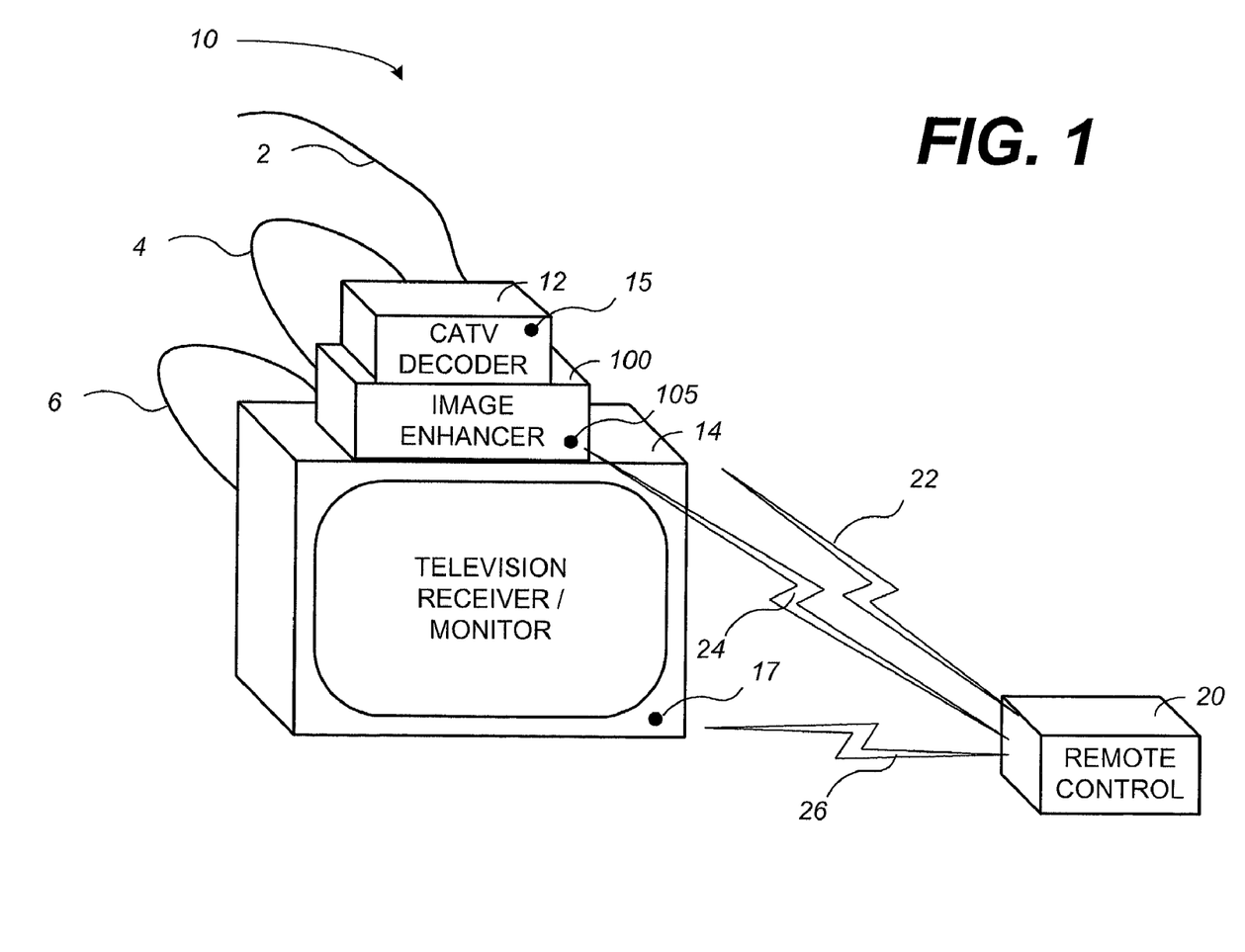
FIG. 1 is a schematic diagram illustrating a possible operational environment for an image enhancing system.

Turning now to the drawings, wherein like referenced numerals designate corresponding parts throughout the drawings, reference is made to FIG. 1, which illustrates a schematic of an exemplary operational environment suited for an image enhancer. In this regard, an exemplary operational environment 10 may comprise a community antenna television (CATV) decoder 12, an image enhancer 100, a television receiver/monitor 14, and a multiple-unit remote control 20. As illustrated in FIG. 1, a coaxial cable 2 coupled to the CATV network may supply a broadband input signal comprising hundreds of digitally encoded and block discrete cosine transform (DCT) compressed video input signals to the CATV decoder 12. The compressed video signals may be compressed using the MPEG-2 video signal compression standard, other block DCT compression schemes, as well as, other digital processing methods. As shown in FIG. 1, the CATV decoder 12 may be coupled to the image enhancer 100 via a first coaxial cable 4. Similarly, the image enhancer 100 may be further coupled to the television receiver/monitor 14 via a second coaxial cable 6.

As also illustrated in FIG. 1, each of the CATV decoder 12, the image enhancer 100, and the television receiver/monitor 14 may be configured with a communications port 15, 105, and 17, respectively. As is well known, the communications ports 15, 105, and 17 may be configured to receive one or more remotely generated control signals 22, 24, 26 from one or more compatibly configured remote control devices 20. It will be appreciated that the remotely generated control signals 22, 24, and 26 may comprise radio frequency, infrared frequency, or other portions of the frequency spectrum. As is known, the remotely generated control signals 22, 24, and 26 may comprise on/off, input channel selection, mode selection, volume adjustment and other similar commands. In the specific case of the image enhancer 100, it is contemplated that the communication port 105 associated with the enhancer 100 may be configured to receive at least on/off, input channel selection, bypass mode selection, image artifact detection threshold, comparative adjustment threshold, region sensitivity, and block sensitivity commands from a remote control device 20.

Generally, the CATV decoder 12 will be configured to selectively demultiplex one or more compressed video signals and supply the demultiplexed signals to the input of an appropriately configured image decoder (not shown). For example, if the desired video signal is encoded with a MPEG-2 encoder, the image decoder (not shown) will be a MPEG-2 decoder. It will be appreciated that the nature of the video signal path previously described may vary greatly depending on the specific design of the television receiver/monitor 14 and any other desired video signal producing devices that may be added to the operational environment 10.

In a first example, the television receiver/monitor 14 may comprise an analog television (ATV). The ATV may provide composite, S-video, and component input jacks suited for receiving like analog video input signals from a number of devices, such as but not limited to, an analog video cassette recorder (VCR) (not shown), a video game console (not shown), a digital video disk (DVD) player (not shown), and the CATV decoder 12. In a second example, the television receiver/monitor 14 may comprise a digital television (DTV). The DTV may provide a number of digital input jacks suited for receiving digital video input signals from a number of devices, such as but not limited to, a personal computer, a digital video disk (DVD) player with digital output capability (not shown), and the CATV decoder 12 (assuming the unit is supplied with a digital video output jack). In a third example, the television receiver/monitor 14 may provide both analog input jacks as well as digital input jacks.

Regardless of the configuration of the television receiver/monitor 14, in those cases where the video compression scheme used to distribute the video signal used a block DCT technique, the video input signal at the television receiver/monitor 14 may be adversely affected by image artifacts as previously described. An image enhancer 100 in accordance with the present invention may be applied within the video signal path described with regard to FIG. 1 to reduce the harshness of edge discontinuities within an image region without removing high-frequency changes in image content from the image frame. It will be appreciated that the image enhancer 100 need not be a standalone device and may be integrated either within video devices designed to interface with the television receiver/monitor 14 (e.g., the CATV decoder 12) or alternatively within the television receiver/monitor analog receive signal path.

Figure 2:
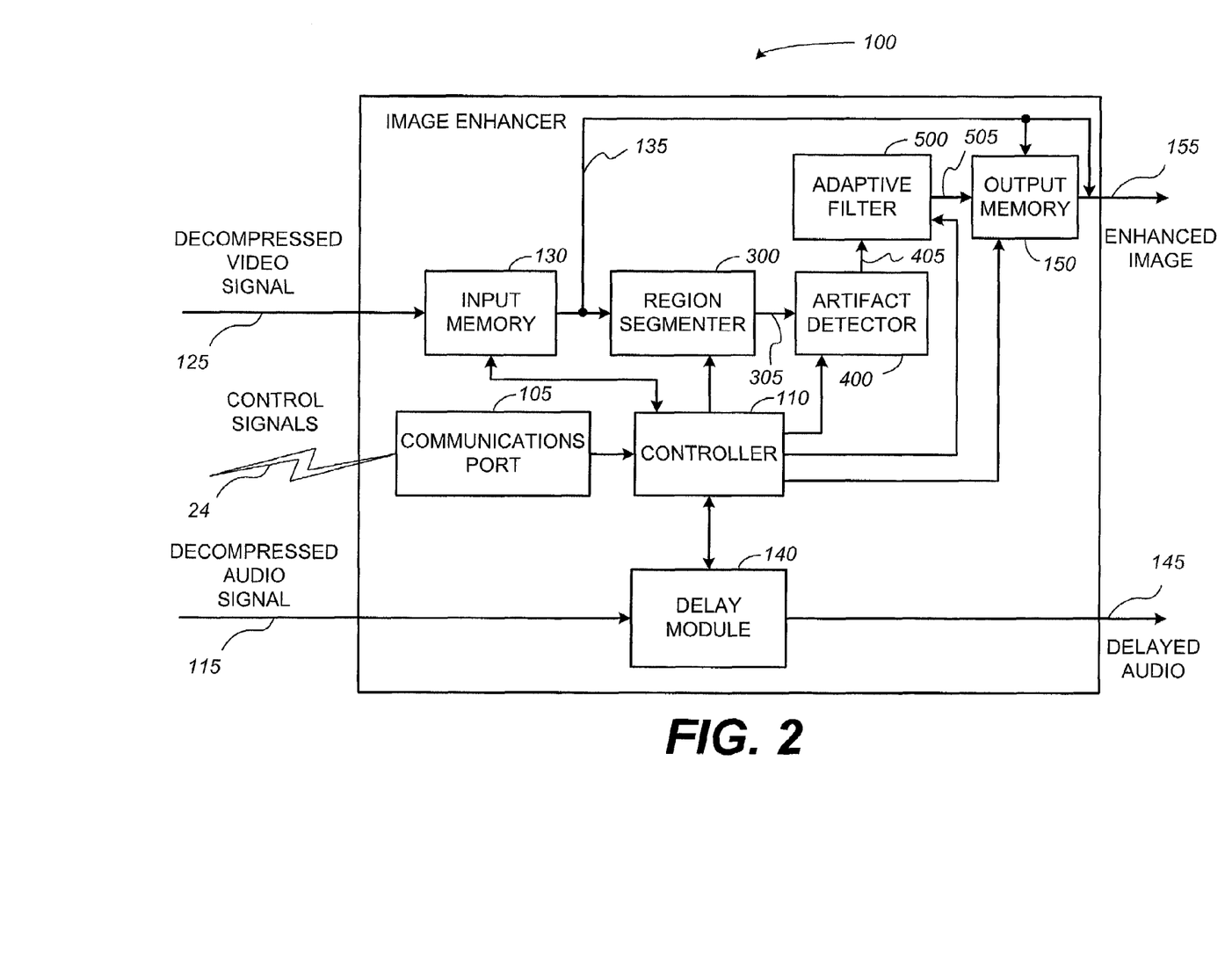
FIG. 2 is a functional block diagram of the image enhancer of FIG. 1.

Reference is now directed to FIG. 2, which illustrates a functional block diagram of the image enhancer 100 of FIG. 1. In this regard, the image enhancer 100 may be configured to receive a decompressed audio input signal 115 and a decompressed component video input signal 125 as well as a plurality of control signals 24 via the communications port 105. In response to these and possibly other inputs, the image enhancer 100 may provide an enhanced image output signal 155 as well as a synchronized audio output signal 145.

As illustrated in FIG. 2, the image enhancer 100 may include a controller 110. The controller 110 may be configured to receive a plurality of input commands from the communications port 105 and in response to the commands may coordinate processing of the decompressed component video input signal 125. In addition, the controller 110 may be configured to monitor the real-time progress of the video image processing and may provide one or more control signals suited to synchronize the decompressed audio input signal 115 with the enhanced image output signal 155. It will be appreciated by those skilled in the art, the controller 110 may comprise one or more application-specific integrated circuits (ASICs), a plurality of suitably configured logic gates, and other well known electrical configurations comprised of discrete elements both individually and in various combinations to coordinate the overall operation of the image enhancer 100.

Furthermore, the image enhancer 100 may be implemented with a microprocessor and one or more memory devices, as well as other hardware and software components for coordinating the overall operation of the various elements suited to enhance image signal information that may be supplied to the television receiver/monitor 14. In addition, it will be appreciated that the image enhancer 100 may include software, which comprises an ordered listing of executable instructions for implementing logical functions, which can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The computer readable medium can be, for instance, an electronic, magnetic, optical, electromagnetic, infrared, or semiconductor system, apparatus, device, or propagation medium.

As illustrated in FIG. 2, the image enhancer 100 may provide a video bypass signal path that may include an input memory 130 communicatively coupled with an output memory 150. As shown in the block diagram of FIG. 2, the video bypass signal path receives the decompressed component video input signal 125 at an input port associated with the input memory device 130. The input memory device 130 may comprise a frame memory suited to receive and process picture element information that may be used to generate an image. An input memory output signal 135 may be indirectly coupled to the enhanced image output signal 155 to complete the video bypass signal path. It should be appreciated that the video signal bypass path may be selected by an appropriately configured control signal 24 interpreted by the controller 110 and resulting in a response, which disables devices in a video-processing path.

The video-processing path as illustrated in FIG. 2 may be inserted between the input memory device 130 and the output memory 150 and may comprise a region segmenter 300, an artifact detector 400, and an adaptive filter 500. Each of the region segmenter 300, artifact detector 400, and adaptive filter 500 devices may be coupled in series with the region segmenter 300 receiving image information from the input memory 130 via the input memory output signal 135. In turn, the region segmenter supplies a portion of the frame to the artifact detector via a region segmenter output signal 305. Next, the artifact detector 400 supplies the adaptive filter 500 with image information associated with regions that contain a picture element data discontinuity via an artifact detector output signal 405. Last, the adaptive filter 500 supplies the output memory 150 with updated picture element data values via an adaptive filter output signal 505.

Operationally, the video-processing path of the image enhancer 100 may function as follows. The input memory 130 may receive image information from the decompressed video signal 125. In accordance with one or more control inputs from the controller 110, the input memory 130 may provide the image information to the region segmenter 300 via the input memory output signal 135. The region segmenter 300 may format the information by subdividing the information into a plurality of M×M picture element regions in response to a region sensitivity value, M, that may be supplied or derived via a command generated by the remote control 20 (FIG. 1). The region sensitivity value, M, may then be forwarded to the controller 110 via the communications port 105 for further distribution as necessary throughout the various elements of the image enhancer 100. It will be appreciated that the region segmenter 300 may start by defining an image frame reference picture element and may sub-divide the image frame into a plurality of M×M regions by systematically advancing every M picture elements in a horizontal or vertical direction across the picture elements to designate a reference picture element for the next M×M region. After a row or column of picture elements is exhausted, the region segmenter 300 may be configured to advance M picture elements vertically or horizontally, respectively, depending upon which direction is selected as the first direction to advance through the picture element array. It should be further appreciated that it may be preferable to select values of M such that M is a factor of the both the number of picture elements in the horizontal and the number of picture elements in the vertical direction in the image frame to be processed. In this way, each of the M×M regions will contain the same number of picture elements.

After having segmented the image frame into a plurality of M×M region segments, the region segmenter 300 may provide the artifact detector 400 with a reference indicator for each of the plurality of a regions along with the individual picture element information associated with the picture elements contained within each respective region via the region segmenter output signal 305.

In turn, the artifact detector 400 may be configured to receive each M×M regional array of picture elements and perform one or more statistical tests on at least one picture element data element associated with each of the picture elements in the region of interest. The artifact detector 400 may be further configured to compare the results of the one or more statistical tests with an image artifact detection threshold, $DET_{TH}$, which may be supplied by the controller 110 to determine if the region of interest is likely to contain an image artifact. When one or more of the statistical tests result in a value that exceeds the image artifact detection threshold, $DET_{TH}$, the artifact detector 400 may be configured to forward the region along with an identifier suited to locate the region within the image frame to the adaptive filter 500 via the artifact detector output signal 405.

Next the adaptive filter 500 may be configured to receive original picture element information from the entire frame from the input memory 130 along with the identified regions with image artifacts and the image information associated with the artifact affected regions. In addition, the adaptive filter 500 may receive a block sensitivity value, N, and a comparative adjustment threshold, $COMP_{TH}$. It is significant to note that the block sensitivity value, N, may or may not be associated with the size of the block of picture elements used by the standard video compression technique to compress/decompress the video signal prior to introduction to the image enhancer 100. The only limitation on the magnitude of the block sensitivity value, N, is that it is smaller in magnitude than the region sensitivity value, M.

As will be explained in greater detail with regard to the discussion of FIGS. 5, 6, and 8A and 8B, the adaptive filter 500 may be configured to progressively compare at least one picture element data value associated with each of the picture elements comprising each of the identified regions affected by an image artifact with each of its nearest neighbors in a first comparative scan direction. If the comparison result for a particular picture element comparison exceeds the comparative adjustment threshold, $COMP_{TH}$, and the picture element comparison coincides with a N×N block boundary within the region of interest, the present picture element data value is adjusted. Otherwise, if the picture element comparison is performed between picture elements within a N×N block the present picture element under test is not adjusted. In this way, image artifacts that result from the loss of data information in the image compression/decompression may be filtered or smoothed without removing high-frequency picture element data transitions that were present in the original image.

As illustrated in FIG. 2, the image enhancer 100 may use the output memory device 150 to assemble an enhanced image frame output 155 that may be forwarded to the television receiver/monitor 14 (FIG. 1). In this regard, the output memory device 150 may be configured to receive the input memory output signal 135 as well as any adjusted picture elements from the adaptive filter 500 via the adaptive filter output signal 505. The output memory 150 may be configured to simply replace original picture element information associated with respective picture elements that have been adjusted by the adaptive filter 500.

Figures 3A, 3B:
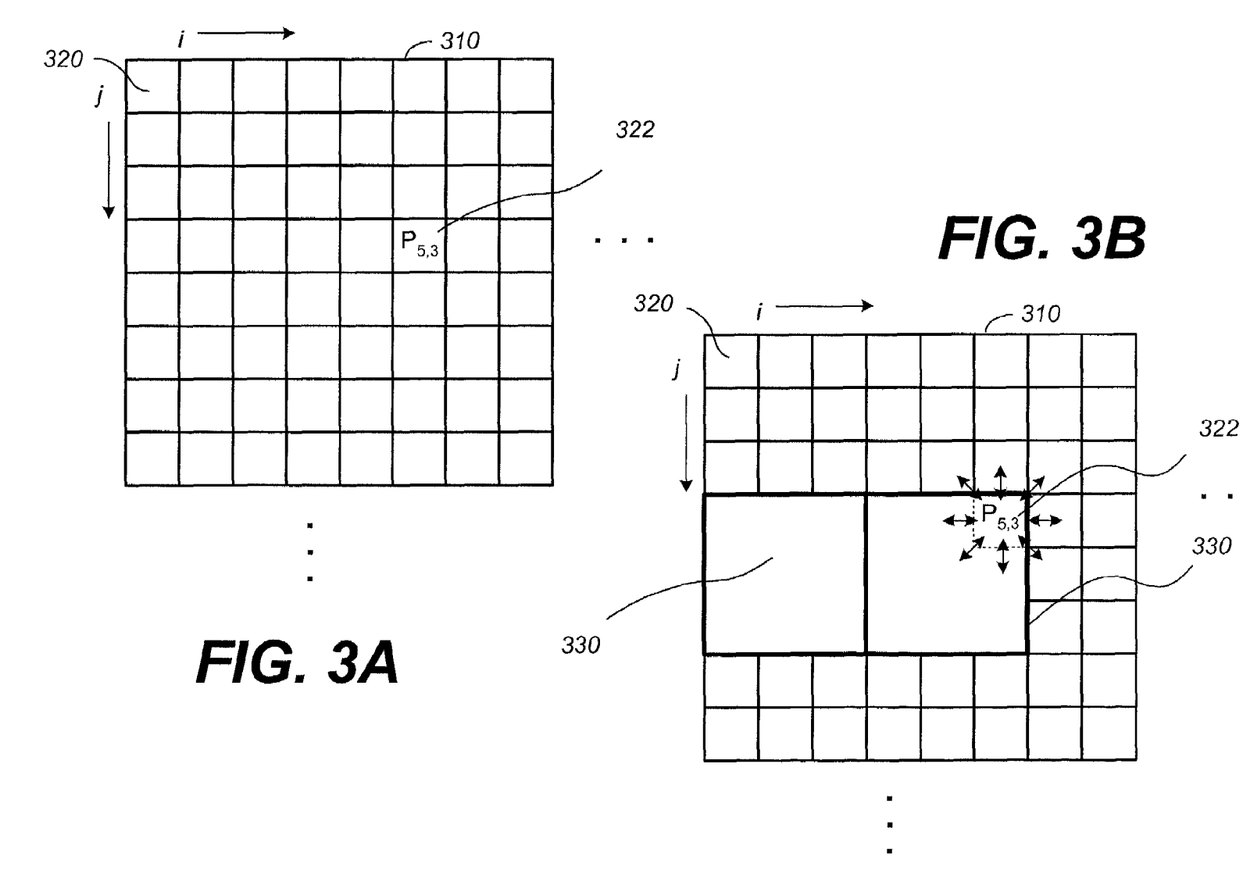
FIGS. 3A and 3B are schematic diagrams illustrating the operation of a region segmenter that may be associated with the image enhancer of FIG. 2.

Reference is now directed to FIG. 3A, which illustrates an example of an image region. In this regard, FIG. 3A illustrates a single example of an 8×8 region 310. As illustrated, the region 310 may be defined by a region reference 320, which may comprise one of the corner picture elements of the region 310. It will be appreciated that a corner picture element is preferred to identify the region 310 in order to simplify individual picture element data transfers and calculations. As shown, individual picture elements may be identified by their relative position from the region reference 320 by using a horizontal counter, i, and a vertical counter, j. Using this picture element identification scheme, an exemplary picture element 322 may be otherwise known as $P_{5,3}$. Each of the 63 remaining picture elements may be similarly indexed. It should be appreciated that separate and distinct regions 310 will continue in a two-dimensional array such as to form the complete image frame.

Reference is now directed to FIG. 3B, which presents a second example of an 8×8 region 310, as well as, two fundamental concepts associated with the image enhancer 100 (FIGS. 1 and 2). As illustrated in FIG. 3B, a portion of the region 310 may be further subdivided by a plurality of N×N image blocks 330 (two 3×3 blocks shown for example only). As will be further explained in association with the adaptive filter 500 and the method for reducing image artifacts in a discrete cosine transform (DCT) compressed and decompressed image, the image blocks 330 serve to identify image sub-regions that should comprise fairly accurate image information as a result of the nature of block DCT based data compression/decompression techniques. It is expected that image artifacts are most often introduced at the edges of the sub-regions or image blocks 330. As a result, it is contemplated that picture elements that share an edge with an image block 330 may be suitable for adjustment by the image enhancer 100.

It should be appreciated that in practice it may be advantageous to set the block sensitivity value, N, such that it is equivalent with the block size used in the original block DCT compression/decompression technique used to generate the image frame. However, it is contemplated that for certain viewers and certain types of image content, it may be advantageous to select other block sensitivity values, N, as may suit the individual viewing tastes of the viewer.

In addition to the concept of using block edges to selectively identify picture elements suited for adjustment, FIG. 3B illustrates a second fundamental concept associated with the image enhancer 100 (FIGS. 1 and 2). In this regard, attention is directed to picture element 322 (i.e., $P_{5,3}$). As shown in FIG. 3B, it is contemplated that an image smoothing comparison be performed for at least one picture element data value associated with each picture element within the region 310 and at least one of the picture element's 322 nearest neighbors.

It will be appreciated by those skilled in the art that in order to construct an operationally efficient adaptive filter 500 a determination may be made as to whether a picture element of interest resides at an intersection between adjacent blocks 330. If the result of the determination is affirmative, the adaptive filter may proceed to compare and adjust one or more data values associated with the picture element of interest. In this way, the processing time associated with picture elements within the interior of an image block 330 can be avoided.

Figure 4:
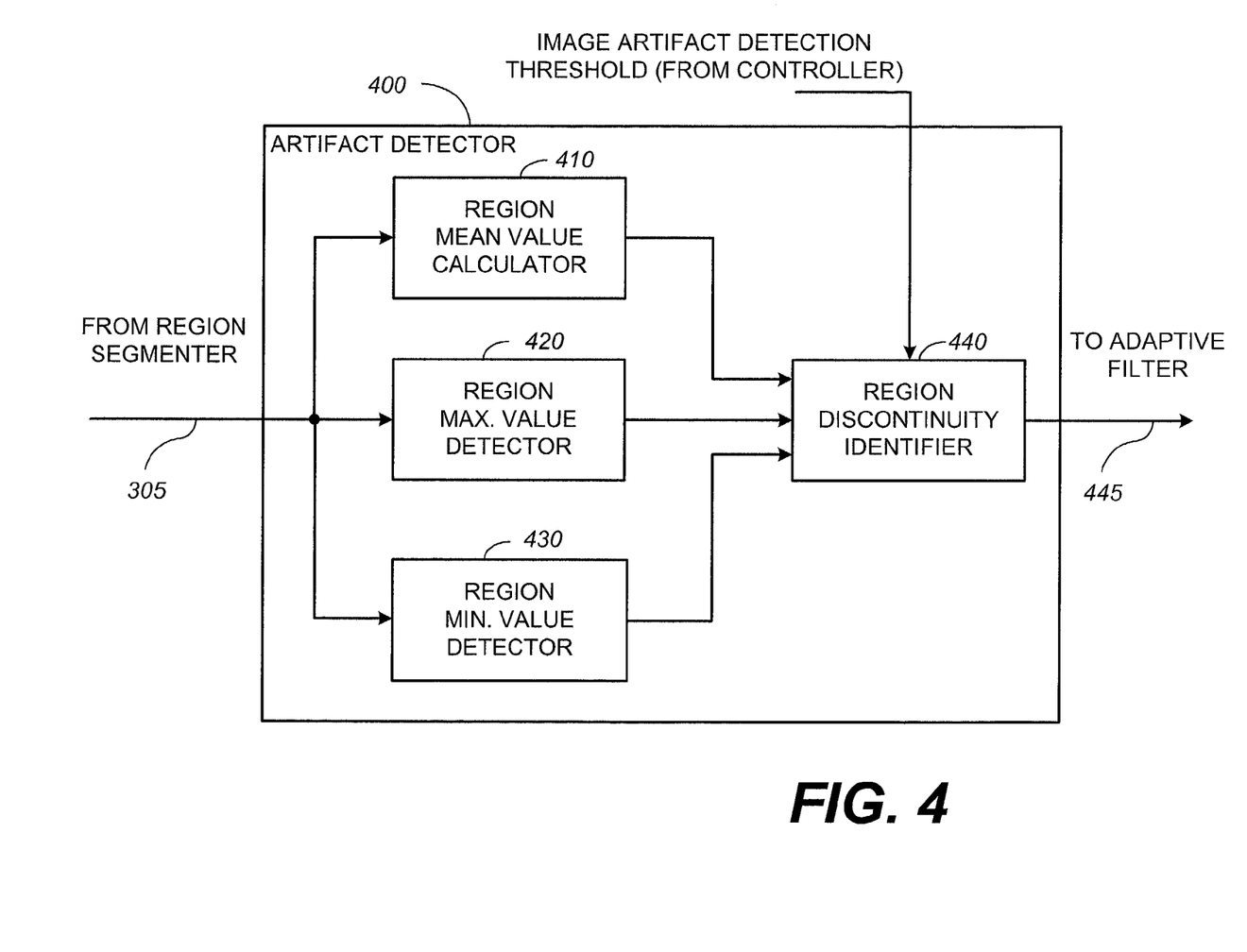
FIG. 4 is a functional block diagram of an artifact detector that may be associated with the region segmenter introduced in FIG. 2.

The relationships between an image region 310, image blocks 330, and picture elements 322 having been briefly described with regard to FIGS. 3A and 3B, reference is now directed to FIG. 4, which presents a functional block diagram of the artifact detector 400 introduced in the image enhancer 100 FIG. 2. In this regard, the artifact detector may include a mean value calculator 410, a maximum value detector 420, a minimum value detector 430, and a region discontinuity identifier 440. As illustrated in FIG. 4, the region segmenter output signal 305 may be supplied to each of the mean value calculator 410, maximum (max.) value detector 420, and the minimum (min.) value detector 430. In turn, each of the devices may generate a result indicative of one or more picture element data values associated with the picture elements 322 (FIGS. 3A and 3B) that comprise the region 310. As illustrated in FIG. 4, a mean value calculator output, a max. value detector output, and a min. value detector output may be forwarded to the region discontinuity identifier 440.

The region discontinuity identifier 440 may be communicatively coupled with the controller 110 (FIG. 2) to receive the image artifact detection threshold, $DET_{TH}$. The region discontinuity identifier 440 may be configured to generate the absolute value of the difference between both the min. and the max. picture element data values within the region with the mean picture element data value for the region. In addition, the region discontinuity identifier 440 may be configured to compare the differences with the image artifact detection threshold supplied by the controller 110 (FIG. 2). For those image regions where either of the differences exceeds the artifact detection threshold, the region discontinuity identifier may be configured to forward an identifier for the region 310 as well as the picture element information associated with the individual picture elements contained within the region to the artifact detector output signal 445.

Figure 5:
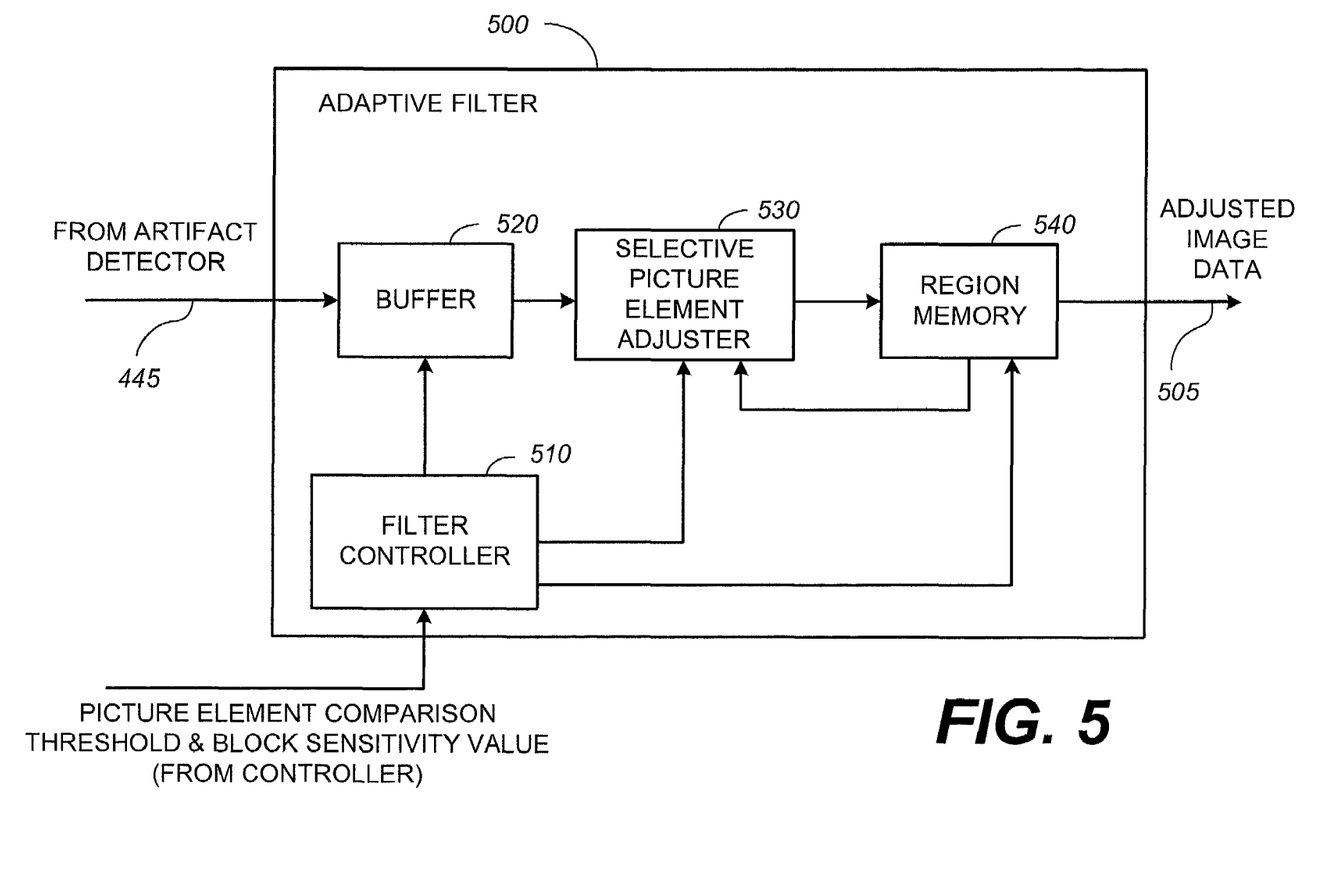
FIG. 5 is a functional block diagram of an adaptive filter that may be associated with the artifact detector of FIG. 4.

Reference is now directed to FIG. 5, which presents a functional block diagram of an adaptive filter that may be associated with the artifact detector of FIG. 4. In this regard, the adaptive filter 500 may include a filter controller 510, a buffer 520, a selective picture element adjuster 530, and a region memory 540. As illustrated in FIG. 5, the adaptive filter 500 may be configured to receive the artifact detector output signal 445 as well as a plurality of inputs from the controller 110 (FIG. 2). After possibly selectively adjusting one or more data values associated with the individual picture elements of the present region 310 (see FIGS. 3A and 3B), the adaptive filter may be configured to provide an adjusted image data output signal 505.

Operationally, the adaptive filter 500 may store an identifier along with the picture element data associated with a region previously identified in the artifact detector 400 as having an image artifact in the buffer 520. The filter controller 510 may be configured to receive the picture element comparison threshold and the block sensitivity value from the controller 110 (FIG. 2). The filter controller 510 may be configured to provide these values to the selective picture element adjuster 530. As illustrated in the functional block diagram of FIG. 5, the selective picture element adjuster 530 may receive a region of data from the buffer 520. Having received the controller 110 input values and a region of picture element data values, the selective picture element adjuster 530 may proceed to perform an element by element comparison of at least one picture element data value associated with each picture element and those of its nearest neighbors. It should be appreciated that the comparison may include only picture elements in a select relationship (e.g., horizontal and adjacent, vertical and adjacent, or diagonal and adjacent) with one another. It should be further appreciated that the comparison may include a mathematical combination between a picture element of interest and its nine adjacent picture elements. Regardless of the comparison performed, it is contemplated that the selective picture element adjuster modify only picture elements that form an intersection between adjacent blocks as identified by the block sensitivity value and where the picture element comparison exceeds the picture element comparison threshold. The picture element modification may comprise a mathematical combination of a picture element of interest and one or more adjacent picture elements.

As further illustrated in FIG. 5, modified picture element values may be forwarded to the region memory 540 where the values may be temporarily buffered. After having systematically analyzed the picture element data values for the region by proceeding in a first direction, (e.g., horizontally or vertically) the selective picture element adjuster 530 may be configured to analyze the data in a second direction different from the first direction using the original picture element data values for picture elements not adjusted in the first analysis along with updated (i.e., buffered) values for picture elements modified during the first analysis. After having smoothed image artifacts from the region, the adaptive filter 500 may be configured to forward the contents of the region memory 540 via the adaptive filter output 505 to the output memory 150 (FIG. 2). The output memory 150 may be configured to receive each of the smoothed regions from the adaptive filter 500 and generate an image artifact reduced image frame by replacing only the smoothed regions in the image frame.

In an alternative embodiment, the adaptive filter 500 may be replaced by an edge-preserving low-pass filter (not shown). The edge-preserving low-pass filter may be applied to reduce contouring artifacts frequently visible in image areas with little high-frequency content, such as in a background or border that appears to have a solid color. As previously described, while image areas may appear to comprise a single solid color, various image compression and decompression techniques in combination with post decompression processors may introduce image artifacts visible within the affected image areas. An edge-preserving low-pass filter may be configured to retain detail associated with a boundary or edge, while smoothing or reducing the harshness between image artifact affected pixels.

Figure 6:
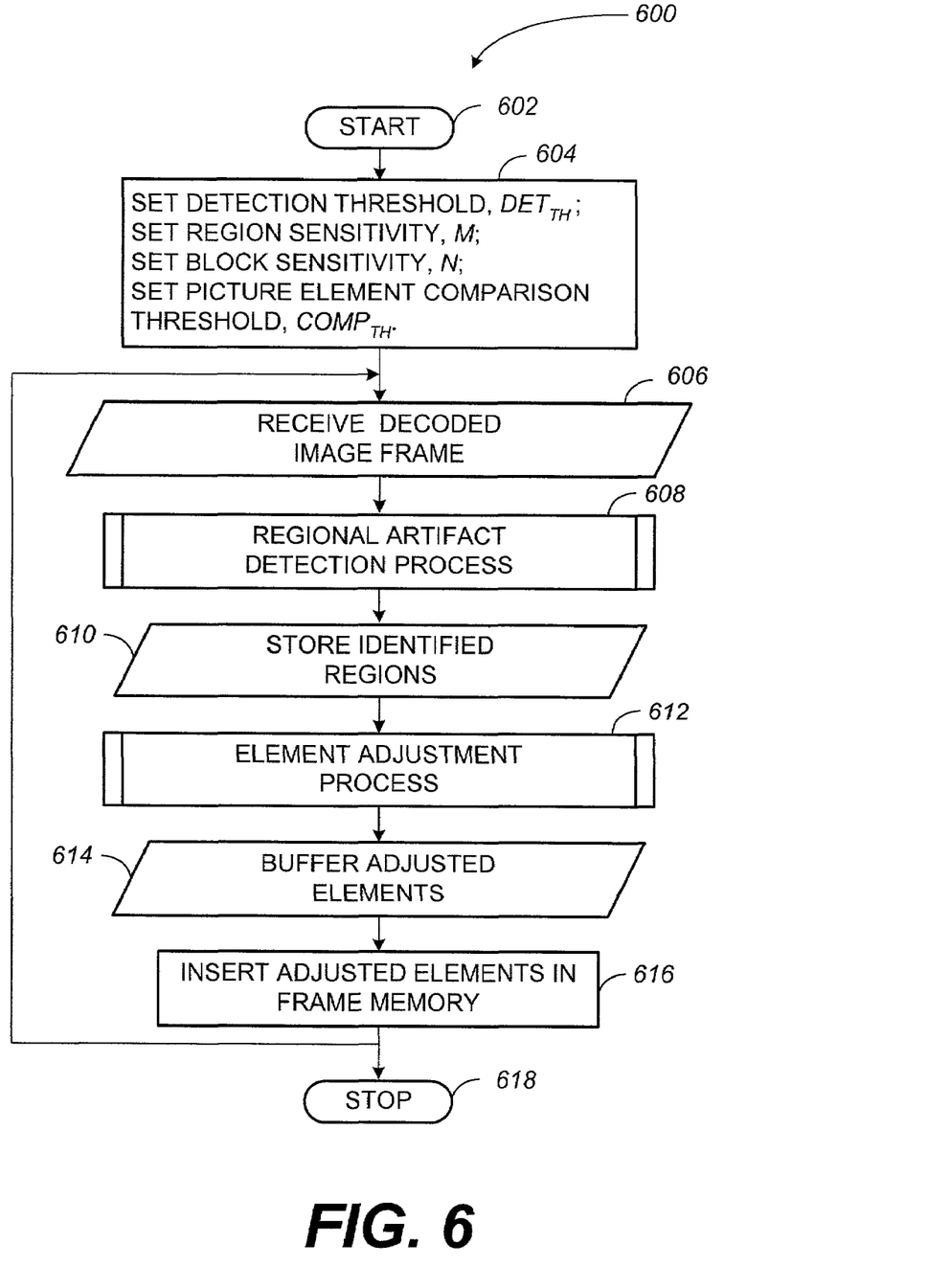
FIG. 6 is a flowchart illustrating a method for reducing image artifacts from an image frame that may be performed by the image enhancer of FIG. 2.

The various elements of an image enhancer 100 having been introduced and described with regard to FIGS. 2 through 5, reference is now directed to FIG. 6, which illustrates a method for reducing image artifacts from an image frame that may be performed by the image enhancer 100 of FIG. 2. In this regard, a method for reducing image artifacts 600 may begin with step 602, herein labeled, "Start." Next, in a system initialization step, the method for reducing image artifacts 600 may set an artifact detection threshold, a region sensitivity, a block sensitivity, and a picture element data value comparison threshold as shown in step 604. A video-processing loop may begin with step 606 where the method for reducing image artifacts 600 receives a decoded image frame. Next, in step 608, the method for reducing image artifacts 600 may perform a regional artifact detection process by analyzing picture element data values in a M×M region. As previously described with regard to FIG. 4, an artifact detector 400 may be designed to identify a plurality of sub-regions of a larger image frame that may include an image artifact by performing one or more statistical tests on the picture element data values associated with the picture elements within the region.

Once regions of the image frame that may contain an image artifact have been identified in step 608, the method for reducing image artifacts 600 may proceed to store both an identifier for each of the regions along with the associated picture element data values for each of the regions with an image artifact as illustrated in step 610. Next, the method for reducing image artifacts 600 may perform a pixel adjustment process as shown in step 612. As previously described with regard to FIG. 5, an adaptive filter 500 may be configured to smooth image artifacts by selectively adjusting one or more picture element data values associated with picture elements that define a block transition. The adjustment may take the form of a mathematical combination of one or more picture element data values associated with adjacent picture elements of a particular picture element of interest.

For example, the mean luminance of the eight adjacent picture elements may be determined and weighted before performing a second mean calculation between the original picture element luminance value and the interim result. In another example, the luminance value of a particular picture element of interest may be combined with the luminance value associated with its horizontally or vertically adjacent nearest neighbors, with the mean luminance value of the original picture element data values replacing the original data value for the picture element of interest. It will be appreciated that color information associated with individual picture element may be analyzed as well by these and other arrangements of neighboring picture elements.

After having completed the picture element analysis and adjustment process in step 612, the method for reducing image artifacts 600 may proceed to buffer the modified picture elements as illustrated in step 614. Next, the method for reducing image artifacts 600 may insert the modified and buffered picture elements into the appropriate locations within the image frame as indicated in step 616. As further illustrated by the flow control arrow of the flowchart of FIG. 6, steps 606 through 616 may be repeated as required to process each successive image frame that together form a video. After detecting an appropriate input indicative of a loss of frame data, a user selected "off" mode request, or the like, the method for reducing image artifacts 600 may terminate as indicated in step 618, herein labeled, "Stop."

Figure 7:
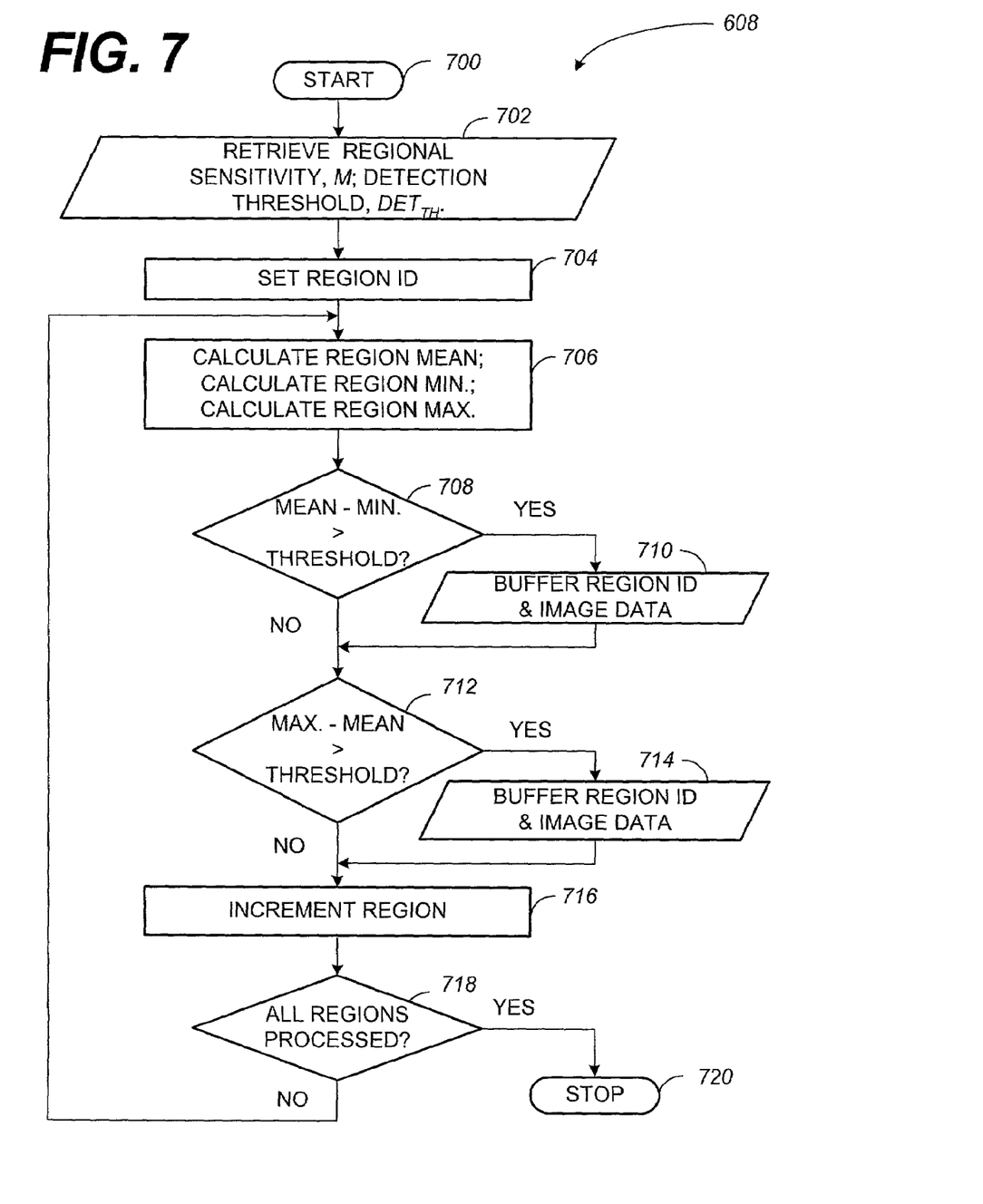
FIG. 7 is a flowchart illustrating a method for detecting image artifacts in a regional area as introduced in the flowchart of FIG. 6.

The method for reducing image artifacts 600 having been introduced and briefly described with regard to the flowchart of FIG. 6, reference is now directed to FIG. 7, which illustrates a method for detecting image artifacts in a regional area as may be performed in step 608 shown in the flowchart of FIG. 6. In this regard, a method for detecting image artifacts 608 may begin with step 700, herein labeled, "Start." In step 702, the method for detecting image artifacts 608 may retrieve a regional sensitivity value, M, and an image artifact detection threshold, $DET_{TH}$. Next, in step 704, the method for detecting image artifacts 608 may identify a present region of interest defined by the regional sensitivity value, M. In step 706, the method for detecting image artifacts 608 may calculate a picture element data value mean for the region, as well as, identify the picture element data value extrema value(s) for the region such as, for example, a picture element data value minimum value and/or a picture element data value maximum value for the region.

The method for detecting image artifacts 608 may then check whether the absolute value of the difference between the picture element data value minimum value for the region and the mean value for the region exceeds the magnitude of the image artifact detection threshold as indicated in the query of step 708. If the determination in step 706 is affirmative, the method for detecting image artifacts 608 may perform step 710 where the region identifier and the associated picture element data values for the region may be buffered. Otherwise, if the determination in step 706 is negative, the method for detecting image artifacts may proceed to step 712.

Similarly, the method for detecting image artifacts 608 may then check whether the absolute value of the difference between the picture element data value maximum for the region and the mean value for the region exceeds the magnitude of the image artifact detection threshold as indicated in the query of step 712. If the determination in step 712 is affirmative, the method for detecting image artifacts 608 may perform step 714 where the region identifier and the associated picture element data values for the region may be buffered. Otherwise, if the result of the query in step 712 is negative, the method for detecting image artifacts 608 maybe configured to perform step 716 where as illustrated the region identifier may be incremented.

The method for detecting image artifacts 608 may proceed by determining if all regions have been analyzed as illustrated in the query of step 718. If the determination in step 718 is negative, the method for detecting image artifacts 608 may return to repeat steps 706 through 718 as required to analyze the image frame. Otherwise, if the determination in step 718 is affirmative, i.e., all image regions have been analyzed, the method for detecting image artifacts 608 may be terminated as indicated in step 720, herein labeled, "Stop."

Figure 8A:
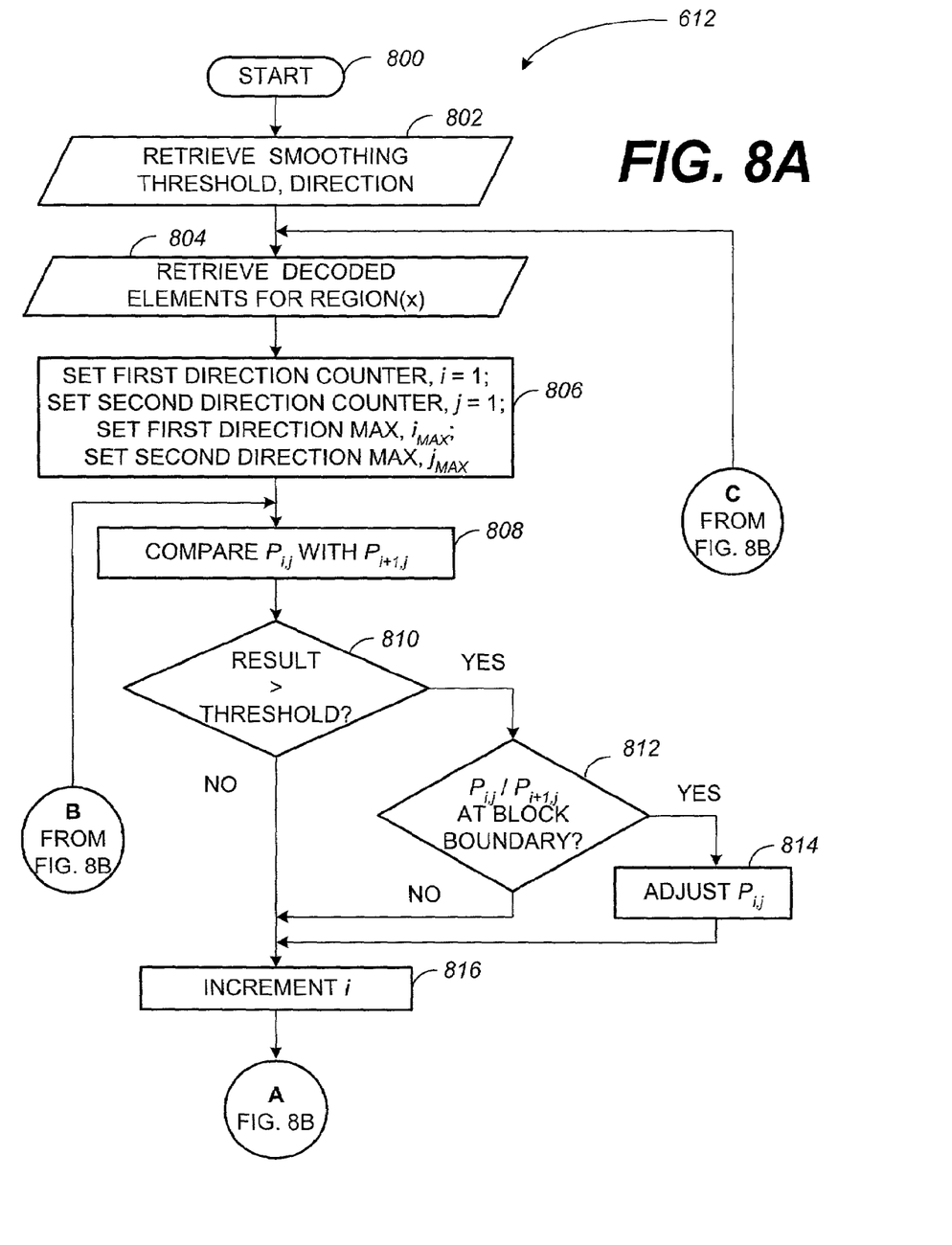
FIGS. 8A and 8B introduce portions of a flowchart illustrating a selective method for adjusting picture element data values as introduced in the flowchart of FIG. 6.
Figure 8B:
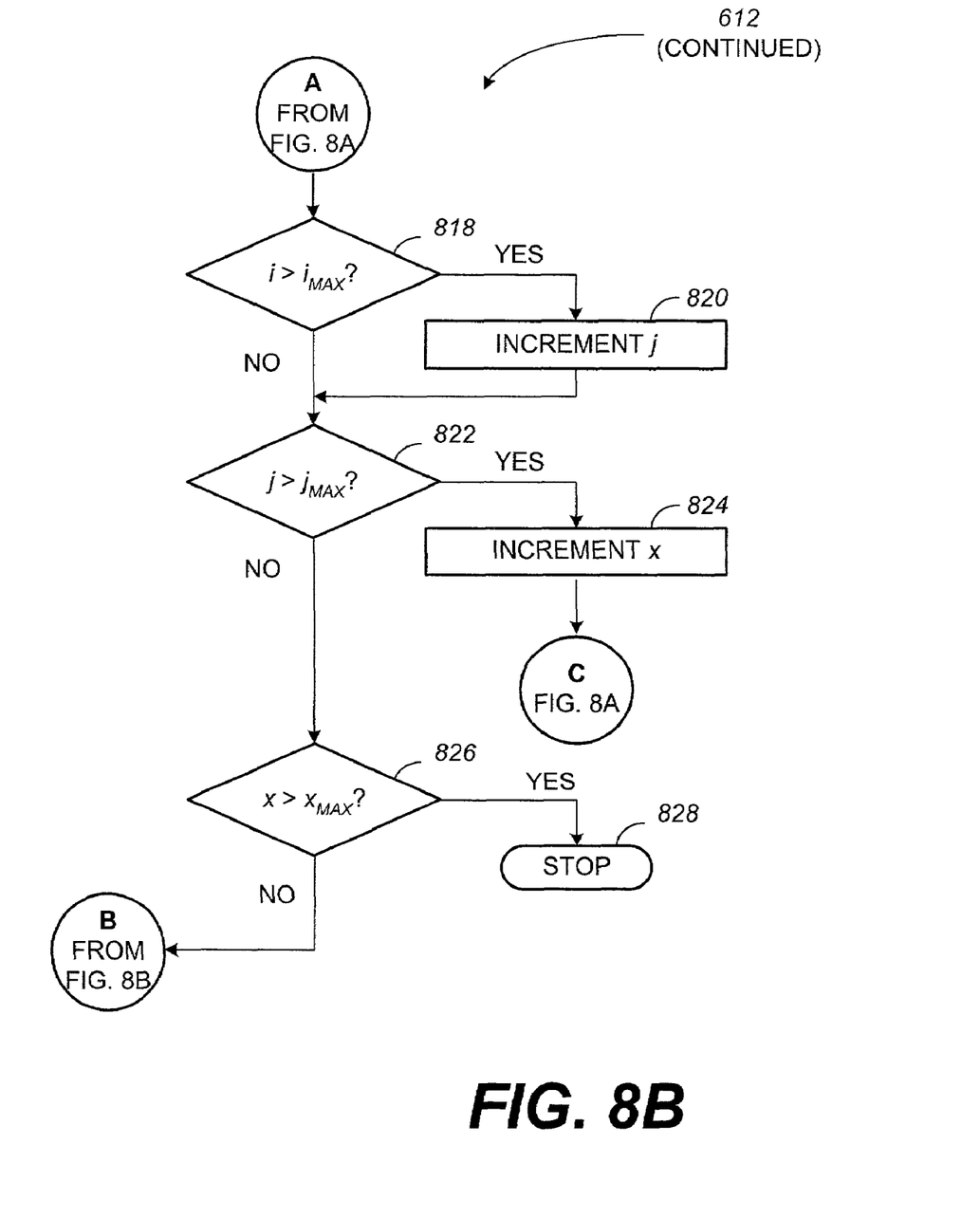

The method for detecting image artifacts 608 having been described with regard to the flowchart of FIG. 7, reference is now directed to FIGS. 8A and 8B, which illustrate a method for selectively adjusting picture element data values as referenced in step 612 of the flowchart of FIG. 6. In this regard, a method for selectively adjusting picture element data values 612 may begin with step 800, herein labeled, "Start." In step 802, the method for selectively adjusting picture element data values 612 may retrieve a smoothing threshold, $COMP_{TH}$, and a desired first analysis direction. Next, in step 804, the method for selectively adjusting picture element data values 612 may retrieve picture element data values associated with each of the picture elements contained within a region previously identified as containing an image artifact. In step 806, the method for selectively adjusting picture element data values 612 may initialize directional counters and maximum values associated with the size of the region.

The method for selectively adjusting picture element data values 612 may perform a mathematical combination in step 808 in order to compare a present picture element of interest with its nearest neighbor in a first direction as defined by the counters in step 806. In step 810, the result of the mathematical combination performed in step 808 may be compared with the smoothing threshold. If the query of step 810 indicates that the result in step 808 exceeds the smoothing threshold, the method for selectively adjusting picture element data values 612 may be configured to perform a second query as illustrated in step 812 to determine if the picture elements compared in step 808 form a boundary that coincides with a block boundary. If the result of the query in step 812 is affirmative, the present picture element may be adjusted as indicated in step 814. It will be appreciated that this adjustment may take the form of an averaging, including a weighted average of the present picture element and its nearest neighbors within the region as long as the condition holds true that the compared picture elements (see step 808) do not form a block boundary.

As illustrated in the flowchart of FIG. 8A, if either the query of step 810 or the query of step 812 result in a negative result, or step 814 has been performed, the method for selectively adjusting picture element data values 612 may continue by incrementing the first directional counter as illustrated in step 816.

Reference is now directed to FIG. 8B, which presents a continuation of the method for selectively adjusting picture element data values 612. In this regard, the method for selectively adjusting picture element data values 612 may continue after connector "A" by making a determination if all picture elements in the first direction have been processed as illustrated in step 818. If the result of the query in step 818 is affirmative, the method for selectively adjusting picture element data values 612 may perform another query to determine if all picture elements in the region have been processed as shown in step 822. If the result of the query in step 822 is affirmative, the method for selectively adjusting picture element data values 612 may increment a region counter and return via connector "C" to step 804 (FIG. 8A) and steps 804 through 824 may be repeated as necessary. Otherwise, if the result of the query in step 822 is negative, the method for selectively adjusting picture element data values 612 may perform a check to see if all image regions with artifacts have been processed as indicated in the query of step 826. If the result of the query in step 826 is negative, the method for selectively adjusting picture element data values 612 may return via connector "B" to step 808 (FIG. 8A) and steps 808 through 826 may be repeated as necessary. Otherwise, if the result of the query in step 826 is affirmative (i.e., all identified image regions have been smoothed) the method for selectively adjusting picture element data values 612 may terminate as indicated in step 828.

Any process descriptions or blocks in flow charts of FIGS. 6, 7, and 8A–8B, should be understood as representing modules, segments, or portions of code which include one or more executable instructions for implementing specific logical functions or steps in the associated process. Alternate implementations are included within the scope of the present invention in which functions may be executed out of order from that shown or discussed, including substantially concurrently or in reverse order, depending on the functionality involved, as would be understood by those reasonably skilled in the art of the present invention.

While the image enhancer 100 may be implemented in one or more hardware based configurations so as to provide the necessary processing speed to smooth video image frames at a reasonable frame rate, it will be appreciated that an image enhancer 100 in accordance with the teachings and concepts of the present invention may be implemented in software operable on a computing device such as but not limited to a special or general purpose digital computer, such as a personal computer (PC; IBM-compatible, Apple-compatible, or otherwise), workstation, minicomputer, or mainframe computer.

When the image enhancer 100 is implemented in software, it should be noted that the processing step as previously described in association with the flowcharts of FIGS.

6, 7, and 8A–8B can be stored on any computer readable medium for use by or in connection with any computer related system or method.

In the context of this document, a computer readable medium is an electronic, magnetic, optical, or other physical device or means that can contain or store a computer program for use by or in connection with a computer related system or method. The image enhancer 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Having thus described the invention, what is claimed is the following:

1. An image processing system suited for post-processing compressed and decompressed images, the system comprising:
    a region segmenter configured to sub-divide data representing at least one image frame to generate a plurality of image regions;
    an artifact detector configured to analyze each of the plurality of image regions for the existence of an image artifact, the artifact detector further configured to identify regions containing an image artifact;
    a filter configured to receive an indication of image regions containing an image artifact from the artifact detector, wherein the filter smoothes at least one picture element data value in accordance with at least one viewer selected parameter to generate modified picture element data; and
    an output memory communicatively coupled with the input memory and with the filter wherein the output memory assembles an image artifact reduced image frame comprising unmodified picture element data from the at least one image frame and smoothed picture element data to generate an artifact reduced representation of the at least one image frame.

2. The system of claim 1, wherein the region segmenter sub-divides the at least one image frame in response to a viewer selected region sensitivity value.

3. The system of claim 1, wherein the artifact detector applies at least one statistical test to the picture element data values comprising the region to identify when the region contains an image artifact.

4. The system of claim 1, wherein the filter selectively smoothes picture element data values comprising the region in response to a block sensitivity parameter and a picture element data value comparison threshold.

5. The system of claim 1, wherein the filter comprises an edge-preserving low-pass filter.

6. The system of claim 1, further comprising:
    a communications port configured to receive the at least one viewer selected imaging parameter; and
    a controller communicatively coupled with the communications port wherein the controller is configured to control the flow of picture elements in response to the at least one viewer selected imaging parameter.

7. The system of claim 1, further comprising:
    a delay module configured to receive a decompressed audio signal, wherein the delay module synchronizes the image artifact reduced image frame with the decompressed audio signal.

8. The system of claim 2, wherein the viewer selected region sensitivity value defines a plurality of picture elements equivalent to the square of the region sensitivity value.

9. The system of claim 3, wherein the at least one statistical test comprises a mean picture element data value.

10. The system of claim 4, wherein the filter smoothes picture element data values when both the absolute value of the difference between picture element data values for adjacent picture elements exceeds the picture element data value comparison threshold and wherein the compared picture elements form a block boundary as defined by the square of a block sensitivity value.

11. The system of claim 4, wherein the block sensitivity parameter and the picture element data value comparison threshold are viewer selected.

12. The system of claim 9, wherein an absolute value of the difference between the mean picture element data value and a maximum picture element data value for the region provides a first interim result, and wherein an absolute value of the first interim result is compared with an image artifact detection threshold.

13. The system of claim 9, wherein an absolute value of the difference between the mean picture element data value and a minimum picture element data value for the region provides a second interim result, and wherein an absolute value of the second interim result is compared with an image artifact detection threshold.

14. An image processing system suited for post-processing compressed and decompressed images, the system comprising:
    means for analyzing data associated with a plurality of picture elements comprising at least one image frame to identify portions of the at least one image frame that contain image artifacts;
    means for smoothing at least one data value associated with the plurality of picture elements in the identified sub-portion of the at least one image frame; and
    means for assembling an image artifact reduced image comprising smoothed picture elements.

15. The system of claim 14, wherein the means for analyzing comprises performing at least one statistical test on the picture element data values on a sub-portion of the at least one image frame.

16. The system of claim 14, wherein the means for smoothing comprises a mathematical combination of a picture element of interest with an adjacent picture element in a first direction to form a first smoothing result, followed by a mathematical combination of the picture element of interest with an adjacent picture element in a second direction using the first smoothing result for the picture element of interest data value for those cases where the picture element of interest is adjacent to a block as defined by a block sensitivity value.

17. The system of claim 14, wherein the means for assembling comprises a frame memory device configured to store both unmodified picture element data and modified picture element data, wherein modified picture element data supersedes unmodified picture element data.

18. The system of claim 15, wherein the at least one statistical test comprises determining the mean picture element data value on a sub-portion of the at least one image frame.

19. The system of claim 16, wherein the mathematical combination of a picture element of interest with an adjacent picture element comprises determining the average data value of the picture element of interest and the adjacent picture element and updating the data value of the picture element of interest with the determined average.

20. A method for reducing image artifacts in a compressed and decompressed image, comprising:
receiving picture element data associated with at least one image frame;
segmenting the at least one image frame into a plurality of regions in accordance with a first viewer selected imaging parameter;
analyzing the plurality of segmented regions to identify regions that contain an image artifact in response to a second viewer selected imaging parameter;
processing the identified regions with an adaptive filter such that at least one picture element data parameter is adjusted in response to both a third and a fourth viewer selected imaging parameters; and
inserting adjusted picture element data values into the at least one image frame.

21. The method of claim 20, wherein the first viewer selected imaging parameter applied in the segmenting step comprises a region sensitivity value.

22. The method of claim 20, wherein the second viewer selected imaging parameter applied in the analyzing step comprises an image artifact detection threshold.

23. The method of claim 20, wherein the third and the fourth viewer selected imaging parameters applied in the processing step comprise a block sensitivity value, and a picture element comparison threshold, respectively.

24. A method for smoothing at least one data value associated with a plurality of picture elements containing image artifacts introduced in a compressed and decompressed image, comprising:
setting a plurality of counters and a plurality of thresholds in response to a plurality of viewer selected imaging parameters;
systematically comparing each of a plurality of picture element data values with a data value associated with an adjacent picture element in a first direction to generate a first interim result, further comparing the first interim result with a first viewer selected imaging parameter, selectively modifying the data value for a picture element of interest to generate a temporary picture element data value when the compared picture elements traverse a block boundary as defined by a second viewer selected imaging parameter;
inserting temporary picture element data values; and
systematically comparing each of the plurality of picture element data values, including the inserted temporary picture element data values with an adjacent picture element in a second direction to generate a second interim result, further comparing the second interim result with a first viewer selected imaging parameter, selectively modifying the data value for a picture element of interest to generate a final picture element data value when the compared picture elements traverse a block boundary as defined by a second viewer selected imaging parameter.

25. The method of claim 24, wherein the steps of comparing are responsive to a first viewer selected imaging parameter comprising a smoothing threshold.

26. The method of claim 24, wherein the steps of comparing are responsive to a second viewer selected imaging parameter comprising a block sensitivity value.

27. A method for identifying image artifacts introduced in a compressed and decompressed sub-region of an image, comprising:
performing at least one statistical test over a plurality of picture element data values comprising the sub-region to generate a test result;
determining a maximum picture element data value for the sub-region; and
determining when the absolute value of the difference between the maximum picture element data value and the test result exceeds a predetermined threshold.

28. The method of claim 27, wherein the step of determining a maximum picture element is replaced with determining a minimum picture element data value for the sub-region and the determining when the absolute value of the difference between the maximum picture element data value and the test result is replaced by determining when the absolute value of the difference between the minimum picture element data value and the test result exceeds a predetermined threshold.

29. An image processing system suited for post-processing compressed and decompressed images, the system comprising:
means for analyzing data associated with a plurality of picture elements comprising at least one image frame to identify portions of the at least one image frame that contain image artifacts, the means for analyzing data comprising a region sensitivity value;
means for smoothing at least one data value associated with the plurality of picture elements in the identified sub-portion of the at least one image frame; and
means for assembling an image artifact reduced image comprising smoothed picture elements.

30. The system of claim 29, wherein the means for analyzing comprises performing at least one statistical test on the picture element data values on a sub-portion of the at least one image frame.

31. The system of claim 29, wherein the means for smoothing comprises a mathematical combination of a picture element of interest with an adjacent picture element in a first direction to form a first smoothing result, followed by a mathematical combination of the picture element of interest with an adjacent picture element in a second direction using the first smoothing result for the picture element of interest data value for those cases where the picture element of interest is adjacent to a block as defined by a block sensitivity value.

32. A method for reducing image artifacts in a compressed and decompressed image, comprising:
receiving picture element data associated with at least one image frame;
segmenting the at least one image frame into a plurality of regions in accordance with a first viewer selected imaging parameter, the first viewer selected imaging parameter comprising a region sensitivity value;

analyzing the plurality of segmented regions to identify regions that contain an image artifact in response to a second viewer selected imaging parameter;

processing the identified regions with an adaptive filter such that at least one picture element data parameter is adjusted in response to both a third and a fourth viewer selected imaging parameters; and inserting adjusted picture element data values into the at least one image frame.

33. The method of claim 32, wherein the second viewer selected imaging parameter applied in the analyzing step comprises an image artifact detection threshold.

34. The method of claim 32, wherein the third and the fourth viewer selected imaging parameters applied in the processing step comprise a block sensitivity value, and a picture element comparison threshold, respectively.

* * * * *